Figure 1:
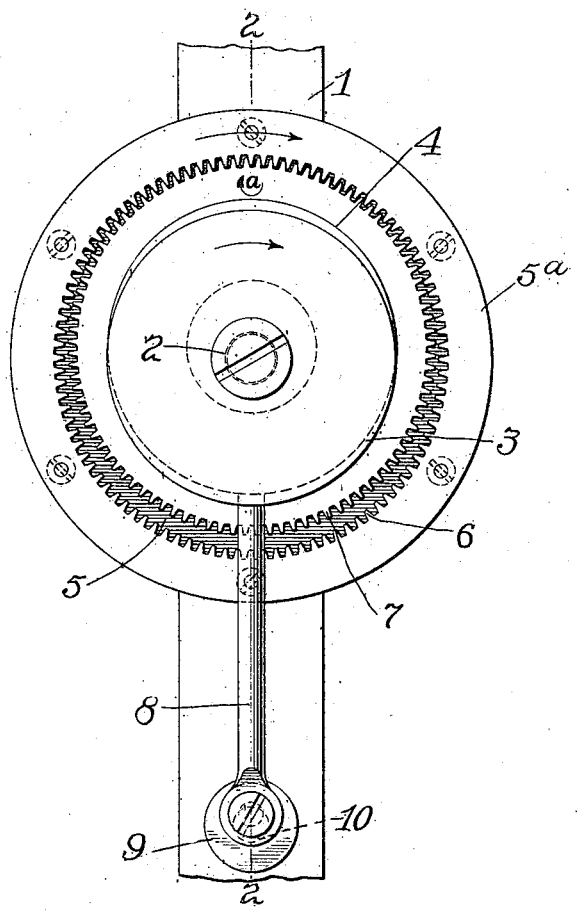

B. GRANVILLE.
MECHANICAL MOVEMENT.
APPLICATION FILED OCT. 28, 1913.

1,141,626.

Patented June 1, 1915.

Attest.
Ed. L. Tolson.
H. L. Alden.

Inventor:
Bernard Granville,
by Spear, Middleton, Donaldson & Spear, Attys.

UNITED STATES PATENT OFFICE.

BERNARD GRANVILLE, OF NEW YORK, N. Y.

MECHANICAL MOVEMENT.

1,141,626.  Specification of Letters Patent. Patented June 1, 1915.

Application filed October 28, 1913. Serial No. 797,852.

*To all whom it may concern:*

Be it known that I, BERNARD GRANVILLE, a citizen of the United States, residing at New York, N. Y., have invented certain new and useful Improvements in Mechanical Movements, of which the following is a specification.

The present invention relates to an improvement in a mechanical movement and has for its object to provide a simple and durable means for transmitting power at a reduction of speed.

This form of mechanical movement is particularly adapted to be applied to a large class of machines, as for example hoisting and traction engines where train gearing has commonly been used to transmit power and at the same time reduce speed.

The use of a mechanical movement such as is contemplated by the present invention, precludes all trouble that might arise from injury or displacement of the various intermediate gears and cogs comprising the gear train.

With these and other objects in view, the invention consists of the construction and arrangement of parts as more fully set forth, illustrated and pointed out in the accompanying specification, drawings and appended claim.

In the drawings similar parts are designated by reference letters of like character and in the views showing one embodiment of the invention.

Figure 2:
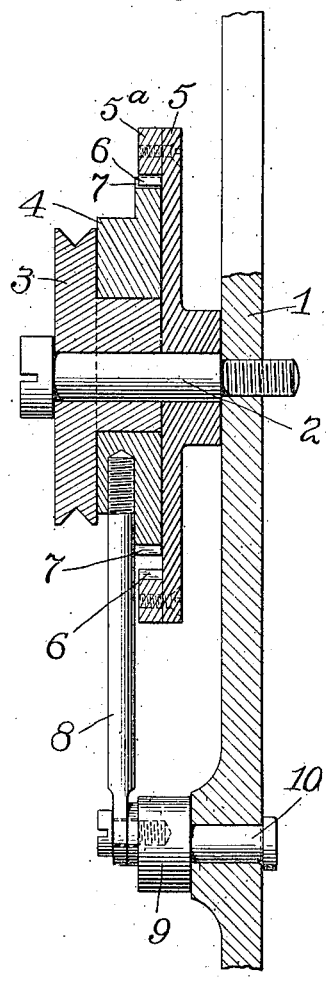

Figure 1 is a view in elevation of the parts assembled. Fig. 2 is a vertical section taken on the line 2—2 of Fig. 1, with parts shown in elevation.

Referring now to the drawings a stud 2 is rigidly secured in the frame-work 1 and upon the shank of this stud the several rotating parts are mounted. The driven wheel 5 has its hub centrally and loosely mounted on the inner portion of the shank of the stud 2. Beyond this on the outer portion of the shank of stud 2, a driving pulley 3, having a laterally extending hub of reduced diameter, is loosely and eccentrically mounted. An intermediate disk 4 is loosely carried on the reduced hub portion of the driving pulley, being concentric therewith, but like the driving pulley having eccentric relation to the stud 2 and driven wheel 5. The driven wheel 5 is formed with a flange 5ª which may be detachably secured to its outer periphery (as shown in the drawings) having inner gear teeth 6. The intermediate eccentric disk 4 has formed around its periphery external gear teeth 7 adapted to engage with the internal gear teeth 6 of the driven wheel 5. Rigidly secured to the under side of the eccentric gear 4 is a vertically depending rod or member 8, the lower end of which is eccentrically mounted to the circular head 9 of a stud 10 loosely carried by the frame 1.

Circular driving motion is imparted to the driving pulley 3 through a belt, or other driving means not shown. The intermediate gear 4 carried on the reduced hub portion of the driving pulley is given an eccentric camming movement, and since the gear teeth 7 on its outer periphery are constantly in mesh with the corresponding inner teeth 6 of the driven wheel 5, motion similar in direction is transmitted thereto. The movement of the intermediate disk 4 is that of an ordinary cam and is limited by the degree of eccentricity of its mounting in relation to the pin 2. The path of movement of an individual tooth during one rotation of the driving pulley 3 is shown diagrammatically by the circular arrow headed line $a$ in Fig. 1.

By varying the relative number of teeth in the two intermeshing gears, different reductions of speed may be obtained. In the present example the reduction bears a ratio of 24 to 1. Thus one stroke of the eccentric cam gear moves the driven gear 1/24 of a revolution, which result is accomplished by providing the driven gear with ninety-six gear teeth, and the eccentric cam gear with ninety-two.

By having the lower end of the depending rod 8 mounted upon the stud-head 9 with the same eccentric relation that the cam gear 4 bears to the stud 2, an even steady movement of the parts is assured. The path of movement of the rod 8 in this form of mounting is such that the rod moves always parallel to its original position. All irregularities and jerky movements are thus done away with. This is an important feature and is of great advantage, particularly in the application of the devices to traction machines, where a smooth continuous movement is desired.

A mechanical movement constructed in accordance with the present invention is particularly adapted for mechanism which is to be run at very high speeds, due to the absence of numerous gearing and the perfect balance existing throughout the working parts.

Having described my invention what I claim is:

A mechanical movement comprising in combination, a frame, a bearing thereon, a driven gear centrally mounted on said bearing, a driving member eccentrically mounted on the bearing, an intermediate cam gear carried on said driving member and eccentric relation to the bearing and driven gear, said intermediate cam gear being in constant mesh with the gear of the driven gear, and a depending member having one end carried by the intermediate cam gear and the other end guided on the frame to move with the same eccentric relation thereto that the cam disk bears to the bearing, substantially as described.

In testimony whereof, I affix my signature in presence of two witnesses.

BERNARD GRANVILLE.

Witnesses:
EDWARD P. SNOWDEN,
B. M. SWIFT.